Nov. 6, 1951 J. R. ORELIND 2,573,927
PORTABLE MILKING MACHINE
Filed Dec. 30, 1947 2 SHEETS—SHEET 1
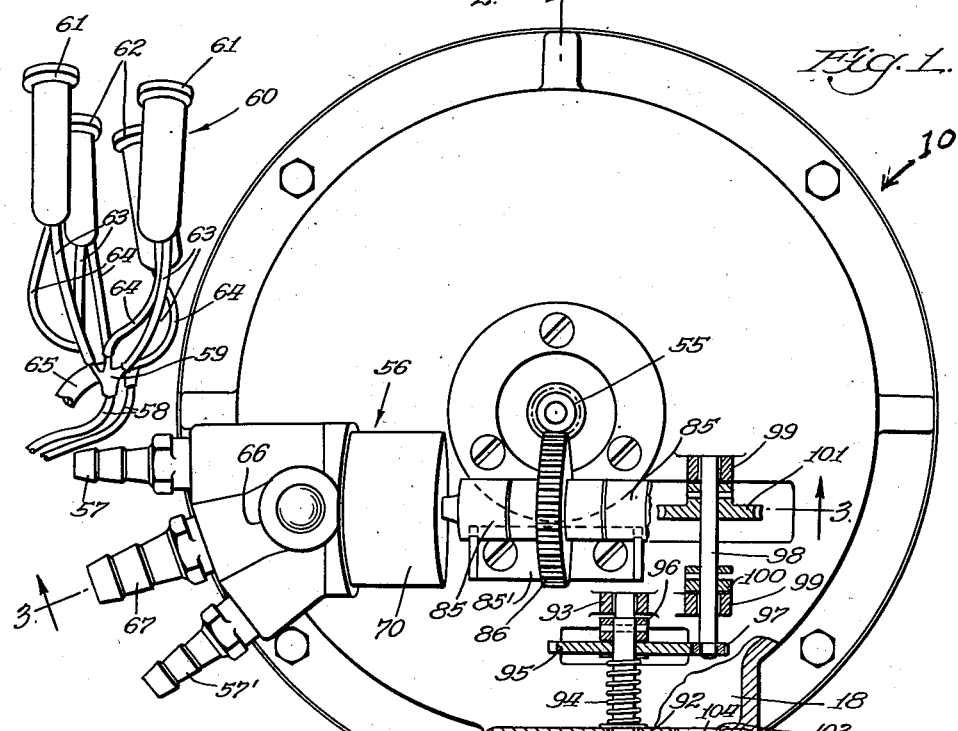
INVENTOR.
John R. Orelind
Paul O. Pippel
Atty.

Nov. 6, 1951     J. R. ORELIND     2,573,927
PORTABLE MILKING MACHINE
Filed Dec. 30, 1947     2 SHEETS—SHEET 2
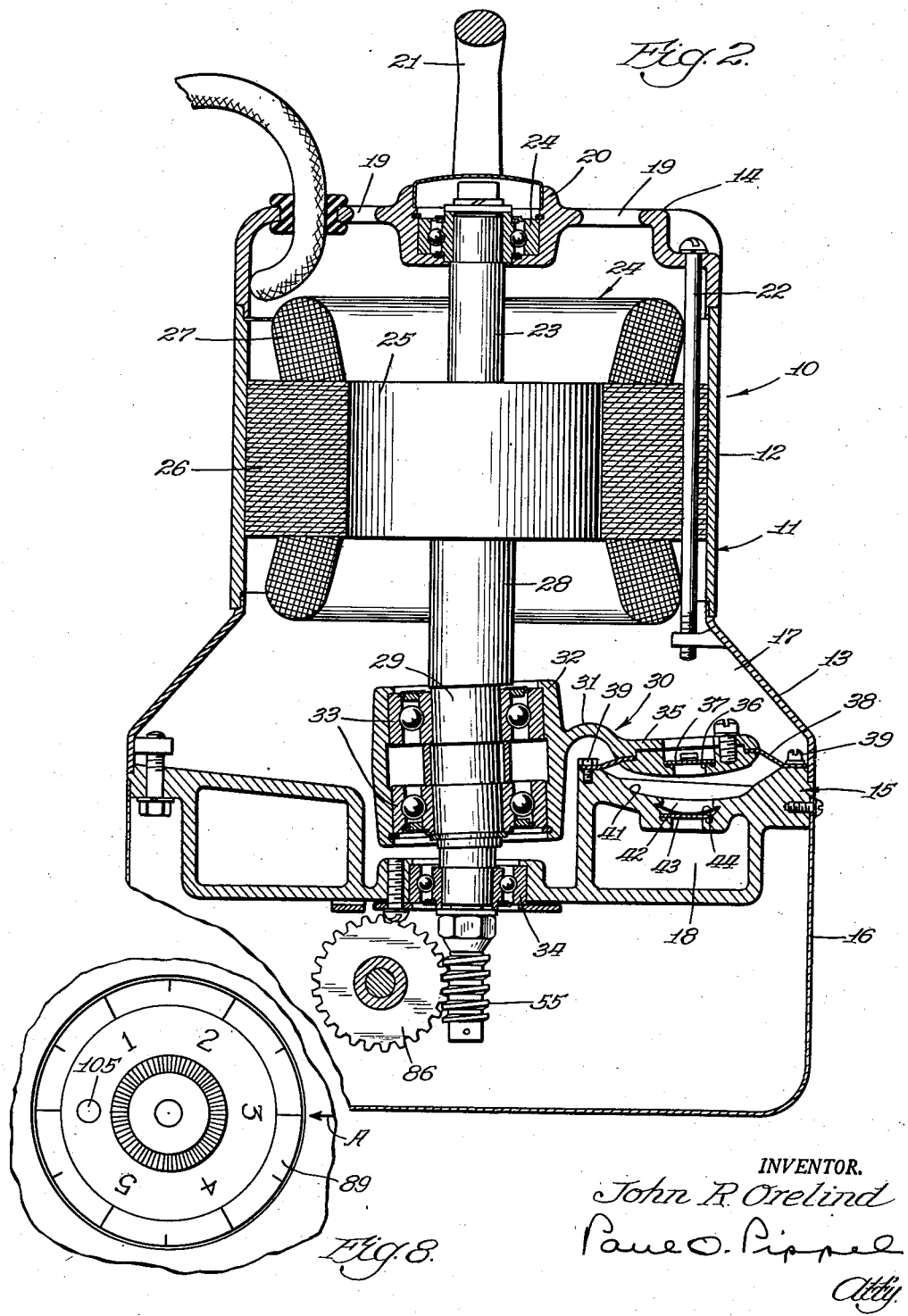
INVENTOR.
John R. Orelind Patented Nov. 6, 1951

2,573,927

UNITED STATES PATENT OFFICE 2,573,927

PORTABLE MILKING MACHINE

John R. Orelind, Wilmette, Ill., assignor to International Harvester Company, a corporation of New Jersey Application December 30, 1947, Serial No. 794,495

5 Claims. (Cl. 119—14.38)

This invention relates to a milking machine. More particularly, it relates to a portable milker unit having an improved pulsating mechanism. In the conventional type of milker machine a pulsating mechanism alternately produces vacuum pulsations within a set of teat cup inflations. The vacuum pulsations are usually effected by a valve element which places the inflations in communication with a vacuum chamber. While one set of teat cups is under a vacuum pulsation, the other set is in communication with the atmosphere, and any vacuum condition that was previously present in the latter set is, of course, destroyed until the vacuum cycle is again repeated.

Experience has shown that the energy required, to continuously provide the required amount of vacuum in the teat cups, is considerable and the vacuum pump which is usually utilized may therefore be subjected to excessive strain under relatively normal working conditions. Applicant has perceived the desirability of creating a more efficient milking unit wherein the vacuum pressure present within one set of teat cups is not completely destroyed by immediately subjecting the teat cup to atmospheric pressure after the vacuum pulsation. Instead, however in applicant's improved milker, the vacuum pressure within both of the cups is equalized during a time interval between the pulsations. By placing both sets of teat cups into communication with one another, the vacuum which has been utilized to deflate one set of cups is therefore distributed between both sets of cups. By thus distributing the vacuum and by equalizing the vacuum pressure prior to the next succeeding pulsation, it can be seen that since the teat cups are already partially under vacuum, the subsequent degree of work required by the vacuum pump or chamber to bring the teat cups to a full vacuum pulsation is, of course greatly lessened.

It is applicant's prime object, therefore, to provide a pulsating mechanism having a valve arrangement arranged to more efficiently regulate the distribution of vacuum and atmospheric pressure to the teat cups.

It is another object to provide an improved milking unit of a type having a power unit, pump, and pulsating mechanism combined and included within a portable housing.

Another object is to provide an improved valve mechanism for a pulsating device, said valve mechanism being arranged to alternately provide for vacuum pulsations in a cluster of teat cups and having means to equalize the pressure within the teat cups during a time interval between the pulsations.

A still further object is to provide an improved milker unit having a power unit arranged to drive a pulsator connected to a rotating valve member, said valve member being constructed to maintain a vacuum depression within a set of teat cups during a time interval between the vacuum pulsations, and having a bore arranged to place all of the teat cups in communication with one another, thereby equalizing the vacuum pressure within all of the teat cups during said time interval.

These and other objects will become further apparent upon reading the description when examined in conjunction with the drawing.

In the drawings:

Fig. 1 is a bottom view of a portable milker unit showing a pulsating valve mechanism and an indicating and signaling device said milker unit being connected to a teat cup cluster, the connections therefor being schematically shown.

Fig. 2 is a sectional view through the milker unit taken substantially along the line 2—2 of Fig. 1.

Fig. 3 is a sectional view taken substantially along the line 3—3 of Fig. 1.

Fig. 4 is a sectional view showing a valve seat taken along the line 4—4 of Fig. 3.

Fig. 5 is a front detail view of a distributor valve.

Fig. 6 is a side view of the same.

Fig. 7 is a rear view of the distributor valve.

Fig. 8 is a detail view showing the dial of an indicating and signaling device.

Referring particularly to Figs. 1 and 2, a milker unit is generally designated by the reference character 10. The milker unit includes a housing 11 consisting of a plurality of cylindrical sections 12 and 13. A top cover member 14 is provided at the upper end of the housing 11. A casing 15 is rigidly secured to the lower end of the cylindrical section 13 and a lower cover 16 is attached to the casing 15.

The housing 11 includes an air or atmosphere chamber 17 positioned above the casing 15. A vacuum or sub-atmosphere chamber 18 is provided within the casing 15.

As shown in Fig. 2 the top cover member 14 is provided with openings 19 arranged to provide for the entry of air into the housing 11. A hub portion 20 of the cover member 14 includes a handle 21. The cover 14 and cylindrical section 12 are connected to the cylindrical section 13 by means of one or more securing members 22.

A shaft 23 is provided for rotation within the housing and forms part of an electrical power unit or motor generally designated by 24. The shaft 23 is connected to a rotor or armature 25 which is arranged to rotate within a field core 26. The field core 26 forms part of a field winding 27 in a conventional manner. The shaft 23 is provided at its lower end with a shaft extension 28 having a turned down lower end 29 which extends into the mechanism of a wobble plate pump generally indicated by the reference character 30.

The wobble plate pump includes a wobble plate 31 which has at its rear end a hub portion 32. The hub portion 32 is provided with a pair of spaced bearing members 33 which are secured within said plate. The turned down end 29 of the shaft extension 28 is journalled at its lower end in a bearing 34 positioned within the casing 15. The wobble plate 31 also includes an arm or extension 35 having a valve opening 36. A flexible valve 37 of spring-like material is positioned over the valve opening 36 for opening and closing the same. A flexible diaphragm 38 is rigidly secured at its inner edge to the arm or extension 35. The diaphragm is further rigidly secured at its outer end by fastener members 39 which are connected to the casing 15. The casing 15 is provided with a dish shaped portion 41 having an opening 42 in alignment with the opening 36 of the arm or extension 35. A flexible valve element 43 is secured over the opening 42 by means of a leaf spring 44.

A worm 55 is connected to the turned down end 29 of the shaft extension 28. The worm 55 is provided to actuate an air distributing member or valve generally designated by the reference character 56.

As best shown in Fig. 1, the casing 15 is provided with a pair of teat cup connections 57 and 57' which extend outwardly of the housing 11. The teat cup connections 57 and 57' are in turn connected to conduits 58, the connection being schematically shown in Fig. 1. The conduits 58 are in turn connected to a milker claw 59 which forms part of a teat cup cluster 60. The teat cup cluster 60 includes two sets of teat cups or teat cup inflations 61 and 62. To each teat cup there are connected milk conduits 63 and pressure conduits 64. A milk run off conduit 65 is in turn connected to the milker claw 59. The type of construction here indicated is conventional in the art, said teat cups including rubber inflations (not shown) in the usual manner.

The casing 15 is provided with a projecting structure 66 to which is connected a constant vacuum fitting 67. The structure 66 is also provided with a vertical bore 68 which is in communication with an annular valve seat 69 best shown in Fig. 4. The valve seat 69 is provided to seat a rotatable valve member 70. The valve seat 69 further includes openings 71 and 72 respectively positioned for communication with the teat cup connections 57 and 57'. A central opening 73 is in communication with the vertical bore 68 and the constant vacuum connection 67.

As best shown in Figs. 5, 6, and 7 the valve member 70 includes an upper arcuate slot or atmosphere port 74 which extends completely through the valve member 70. A pair of bores 75 and 76 are formed in the face of the valve member 70 and these bores are in turn in communication with one another by means of a conduit 77. The valve member 70 is further provided with a lower arcuate recess or vacuum port 78. The recess or port 78 is in communication with a vertical recess 79 which in turn is at all times in communication with the constant vacuum fitting 67 by means of the bore 73.

As best shown in Fig. 7 the rear face of the valve member 70 is provided with a square opening 80 which is in mating engagement with a square shaft extension 81. The shaft extension 81 forms part of a shaft 82 which is journalled in a pair of laterally spaced bearings 83 and 84. The bearings 83 and 84 are supported by means of spaced collars 85 supported on a supporting member 85'. Spaced intermediately between the bearing members 83 and 84 is a pinion or gear 86. The gear or pinion 86 is in driving engagement, as best shown in Fig. 2, with the worm 55.

A worm 87 is connected at the outer end on shaft 82 and this worm is arranged to actuate an indicating and signaling mechanism generally indicated by the reference character 88.

The indicating and signaling mechanism 88 includes a rotatable cap member or dial 89 as best shown in Figs. 1 and 8. The dial 89 is positioned to rotate on the outer surface of a portion of the casing designated by the reference character 90.

The cap member 89 includes a knob 91 which is arranged so that the operator may grip the same for turning said dial. The dial 89 is rigidly secured to a shaft 92 extending inwardly into the housing 11. The shaft 92 is journalled within a stationary supporting member 93 which is in turn connected to the casing 15. A coil spring 94 encircles the shaft 92 and is in abutting relation at one end with the portion 90 of the housing 15. The free end of the coil spring 94 is in abutment with a gear 95 which is in turn adjacent to a stop 96. The gear or pinion 95 is also in meshing engagement with a gear 97 secured to a shaft 98. The shaft 98 is journalled in stationary members or projections 99. A thrust member 100 is connected to the shaft and is in bearing against one of the stationary members 99. The shaft 98 is further connected to and rotated by a gear 101. The gear 101 is in meshing engagement with the worm 87 and is rotated thereby.

As shown in Fig. 1, the signaling element or whistle 102 is rigidly secured within an opening 103 formed in the portion 90. The whistle 102 is also provided with a substantially small opening 104 which in turn may be placed in alignment with an opening 105 formed in the dial.

As best shown in Fig. 8, the dial is provided with indices from 0 to 5, said indices indicating time as related to a timed milking operation. The opening 105 is generally placed in the dial at the zero indice for a reason which will become apparent later. The operation of the signalling mechanism is clearly disclosed in applicant's co-pending continuation-in-part application Serial No. 74,919, filed February 7, 1949, now Patent Number 2,569,187.

Upon actuating the electric motor 24 the wobble pump 30 is placed into operation. As best shown in Fig. 2, the turned down end 29 of the shaft 28 is angularly positioned and connected to the wobble plate 31. Therefore, upon rotation of the turned down end 29 of the shaft, the arm or extension 35 is placed into reciprocating movement. The diaphragm 38 normally seals the space between the arm 35 and the dish shaped portion 41. The arm 35 is contoured to fit into the dish shaped portion 41 and as this arm moves away from said portion the valve 43 opens and by virtue of the depression within the above mentioned space, air rushes past the valve 43 into said space. Upon the downward stroke of the arm 35 the valve 43 closes and the valve 37 is forced open to permit the escape of air into the atmosphere chamber 17. The chamber 18 is therefore placed in a sub-atmosphere or vacuum condition by means of the action of the wobble plate.

The chamber 18 is continuously in communication with the vertical bore 68 and the fitting 67, whereby a constant vacuum is maintained therein. The fitting is in turn connected to a milkerpail (not shown).

The chamber 18 is also in continual communication with the bore 73 which is in communication with the recess 79. The valve member 70 is rotated by means of the gear 86 which is in meshing arrangement with the worm 55. As the valve member 70 rotates, the lower arcuate recess or vacuum port 78, which is under continual vacuum, is placed into communication with the opening 72. Since the opening 72 is in turn in communication with the teat cup connection 57' a vacuum condition within said connection takes place. When this occurs the set of teat cups 61 is subjected to a vacuum and a pulsation takes place. In a similar manner the arcuate recess 78 is moved into communication with the opening 71. A vacuum condition within the connection 57 takes place causing a vacuum pulsation in the teat cups 62. The valve member 70 continues rotation until the openings or bores 75 and 76 are in communication with the openings or bores 72 and 71 whereupon the vacuum within one set of teat cups is equally distributed within both sets of cups by means of the bore 77. It is clearly apparent that just previous to the equalization of the vacuum within all the teat cups, the vacuum pressure within one set of cups is trapped within the teat cup connections, and retained therein until the bores 71 and 72 respectively register with the bores 75 and 76. Upon the registering of these bores with one another, the vacuum pressure which remains within one set of teat cups is thereupon equally divided between both sets of teat cups. By arbitrarily assuming that a proper pulsation requires fourteen inches of mercury in one set of teat cups, it can be seen that upon equalization of the pressure within all of the teat cups, the vacuum pressure within both sets of the cups would then be approximately seven inches. It is clear therefore that just prior to each vacuum pulsation, each set of teat cups already is under a vacuum depression of approximately seven inches. Since 14 inches are required for a full effective pulsation, the work of the pump need only be sufficient to bring the pressure up to this figure. Thus by trapping the total amount of vacuum in one set of teat cups and by subsequently equalizing the pressure within all of the cups, a sufficient amount of vacuum remains in one set of cups whereby the amount of work the pump must accomplish is greatly lessened.

The cycle of operation may be summarized as follows:

The recess 78 is placed in communication with the opening 72 and teat cup connection 57' thereby effecting a vacuum pulsation in teat cup set 61. At this point the opening 71 is placed in alignment with the atmosphere port or slot 74 and the teat cup connection 57 is subjected to the atmosphere, thereby breaking the vacuum within the set of teat cups 62. The opening 72 and teat cups 61 are now under vacuum and the rotation of the valve member continues until the recess 78 is no longer in communication with the opening 72. At this point the vacuum is trapped within the set of teat cups 61. Further rotation of the valve member places the openings 71 and 72 in communication with one another by virtue of the bore 77, whereupon the trapped vacuum is equalized between the sets of cups since the teat cups connections are now in complete communication with one another. Thus when the valve member is rotated whereupon the recess 78 is in communication with the opening 72 a vacuum depression is already provided in the teat cups 62 to assist the vacuum pump in completing the pulsation in teat cups 62. It can be seen that in this construction a lesser amount of work must be accomplished by the pump since a certain amount of vacuum is always present within the teat cup connection. The efficiency of the pulsator is thereby greatly increased.

It can now be seen that a novel portable milker unit has been provided which is of compact construction and includes an improved valve mechanism whereby the efficiency of the milking operation is greatly enhanced.

It is to be understood that modifications and changes may be made in this construction which do not depart from the spirit of the invention as disclosed nor as defined in the appended claims.

What is claimed is:

1. A pulsator for a milking machine comprising a pair of teat cup connections, a constant vacuum connection in communication with said pulsator, means alternately exposing said teat cup connections to atmosphere and vacuum including a movable valve member having a vacuum port in communication with said vacuum connection, said vacuum port being movable with said valve member into communication with a first teat cup connection for producing a depression therein, said valve member including an atmosphere port in communication with said atmosphere connection and in communication with a second teat cup connection for exposing the same to the atmosphere, means for moving said valve-member to break communication between the first teat cup connection and the vacuum connection for a time interval whereby the first teat cup connection remains under a depression, said valve member including a bore arranged to simultaneously register with both of said teat cup connections whereby the depression within the first teat cup connection is equalized between both connections prior to the communication of the vacuum connection with said second teat connection upon further movement of said valve member.

2. A pulsator for a milking machine comprising a pair of teat cup connections, a constant vacuum connection in communication with said pulsator, means alternately exposing said teat cup connections to atmosphere and vacuum including a rotatable valve member having a vacuum port in communication with said vacuum connection, said vacuum port being rotatable with said valve member into communication with a first teat cup connection for producing a depression therein, said valve member including an atmosphere port in communication with said atmosphere connection and simultaneously in communication with a second teat cup connection for exposing the same to the atmosphere, means for rotating said valve-member to break communication between the teat cups and the vacuum and atmosphere connections for a time interval whereby the first teat cup connection remains under a depression, said valve member including a bore arranged to simultaneously register with both of said teat cup connections whereby the depression within the first teat cup connection is equalized between both connections prior to the communication of the vacuum connection with said second teat connection upon further rotation of said valve member.

3. A pulsator for a milking machine comprising a pair of teat cup connections, a valve seat having openings in communication with said teat cup connections, a valve member movable on said valve seat, said valve member having vacuum ports in communication with a source of vacuum and atmosphere ports in communication with the atmosphere, power means for moving said valve member thereby moving said vacuum port into registry with a first teat cup connection for producing a vacuum therein, a second teat cup connection being simultaneously in registry with the atmosphere port, said power means being adapted to move said valve member to break communication between said teat cups and the vacuum and atmosphere connection for a time interval whereby the first teat cup connection remains under a depression, said valve member being further movable and having a bore arranged to simultaneously register with both of said teat cup connections whereby the depression within the first teat cup connection is equalized between both connections prior to the communication of the vacuum connection with said second teat cup connection.

4. A pulsator for a milking machine comprising a pair of teat cup connections, a valve seat having openings in communication with said teat cup connections, a rotatable valve member movable on said valve seat, said valve member having vacuum ports in communication with a source of vacuum and atmosphere ports in communication with the atmosphere, power means for rotating said valve member thereby moving said vacuum port into registry with a first teat cup connection for producing a vacuum therein, a second teat cup connection being simultaneously in registry with the atmosphere port, said power means being adapted to rotate said valve member to break communication between said teat cups and the vacuum and atmosphere connection for a time interval whereby the first teat cup connection remains under a depression, said valve member being further rotatable and having a bore arranged to simultaneously register with both of said teat cup connections whereby the depression within the first teat cup connection is equalized between both connections prior to the communication of the vacuum connection with the second teat cup connection.

5. A pulsator for a milking machine comprising a pair of teat cup connections, a valve seat having openings in communication with said teat cup connections, a rotatable valve member movable on said valve seat, said valve member having vacuum ports in communication with a source of vacuum and atmosphere ports in communication with the atmosphere, power means for rotating said valve members thereby moving said vacuum port into registry with a first teat cup connection for producing a vacuum therein, a second teat cup connection being simultaneously in registry with the atmosphere port, said power means being adapted to rotate said valve member to break communication between said teat cups and the vacuum and atmosphere connection for a time interval whereby the first teat cup connection remains under a depression, said valve member being further rotatable and having connecting means for simultaneously connecting both of said teat cup connections whereby the depression within the first teat cup connection is equalized between both connections prior to the communication of the vacuum connection with the second teat cup connection.

JOHN R. ORELIND.

REFERENCES CITED

The following references are of record in the file of this patent:

UNITED STATES PATENTS

| Number | Name | Date |
|---|---|---|
| 1,333,972 | Gessler | Mar. 16, 1920 |
| 1,410,286 | Dinesen | Mar. 21, 1922 |
| 1,949,875 | Persoons et al. | Mar. 6, 1934 |
| 2,039,958 | Hapgood | May 5, 1936 |
| 2,102,275 | Martin | Dec. 14, 1937 |
| 2,321,616 | Perkins | June 15, 1943 |
| 2,342,327 | Braun | Feb. 22, 1944 |
| 2,416,139 | Babson | Feb. 18, 1947 |

FOREIGN PATENTS

| Number | Country | Date |
|---|---|---|
| 21,432 | Australia | Sept. 11, 1935 |